Aug. 20, 1968 A. M. SQUIRES 3,397,962
PROCESS FOR HYDROGEN OR AMMONIA SYNTHESIS GAS
Filed Feb. 16, 1965

INVENTOR.
ARTHUR M. SQUIRES
BY
ATTORNEY

United States Patent Office 3,397,962
Patented Aug. 20, 1968

3,397,962
PROCESS FOR HYDROGEN OR AMMONIA
SYNTHESIS GAS
Arthur M. Squires, 245 W. 104th St.,
New York, N.Y. 10025
Filed Feb. 16, 1965, Ser. No. 433,066
8 Claims. (Cl. 23—213)

ABSTRACT OF THE DISCLOSURE

There is provided an improved process for producing hydrogen or ammonia synthesis gas in which heat developed by the shifting of carbon monoxide to hydrogen over calcined dolomite is used to drive the endothermic reforming reaction between a hydrocarbon and steam. The steam/hydrocarbon mixture is caused to flow downward through tubes filled with a suitable reforming catalyst, and reformed gases are caused to be shifted are caused to flow upward in counter-current heat-transfer relationship with the mixture undergoing reforming within the tubes. The upward-flowing gases are caused to pass through several fluidized beds of solids at progressively lower temperatures each of which contain intermingled microscopic crystallites of both calcium and magnesium oxides. Heat developed by shift and recarbonation of CaO, together with sensible heat derived from the cooling of the upward-flowing gases, is passed from the fluidized beds to the steam/hydrocarbon mixture within the tubes. If ammonia synthesis gas is desired, a secondary reforming step with air is interposed between the bottom outlet of the vertical tubes and the inlet to the bottommost of the several fluidized beds. The process is conducted at an elevated pressure. Calcined dolomite is supplied to the process from a calcination zone, whose gaseous effluent is advantageously used to generate power.

Background of the invention

This invention relates to the production of hydrogen or ammonia synthesis gas from hydrocarbon feed stocks, such as natural gas, propane, or light naphtha.

In the prior art, hydrogen has commonly been manufactured by a process in which a hydrocarbon is reformed with steam, followed by water-gas shift and carbon-dioxide removal. In the reforming step, a suitable hydrocarbon feed stock is reacted at high temperature with steam in tubes filled with a suitable nickel-base catalyst and fired from the outside by a radiant flame. Methane, for example, reacts with steam according to the reforming reaction:

$$CH_4 + H_2O = CO + 3H_2 \qquad (1)$$

Simultaneously, a portion of CO reacts with $H_2O$ according to the water-gas shift reaction:

$$CO + H_2O = CO_2 + H_2 \qquad (2)$$

A small part of the endothermic heat required to support Reaction 1 is supplied by exothermic Reaction 2, but most of the heat is furnished by the radiant flame. Effluent from the reforming step consists of unreacted methane along with $H_2$, CO, $CO_2$, and $H_2O$. The hydrocarbon present is always methane, whatever the starting raw material. This effluent is cooled, usually by steam-raising surface, and CO is shifted by Reaction 2 over a catalyst bed operating at a temperature well below that of the reforming step. Carbon dioxide is scrubbed from the gas by an absorbent liquor at a still lower temperature, to yield a gas containing primarily $H_2$ along with minor quantities of CO, $CO_2$, and $CH_4$.

Most prior art ammonia synthesis plants of recent construction prepare synthesis gas by a two-step reforming process followed by water-gas shift and $CO_2$ removal. In a primary reforming step, a hydrocarbon feed stock is reacted with steam in fired tubes filled with reforming catalyst, in the manner already described. In a secondary reforming step, gas from the primary reformer tubes is combined with air and reacted over a bed of a suitable nickel-base catalyst. A portion of methane burns with oxygen in air to raise the temperature of the gas mixture, and nearly all remaining methane reacts with steam according to Reaction 1. Effluent from the secondary reforming step consists of $H_2$, $N_2$, CO, $CO_2$, argon, and $H_2O$ together with a small residue of unreacted methane. This effluent is cooled, CO is shifted by Reaction 2, and $CO_2$ is scrubbed from the gas, to yield a gas containing primarily $H_2$ and $N_2$ along with minor quantities of CO, $CO_2$, A, and $CH_4$. The carbon oxides are usually converted to methane in a catalytic methanation step. The relative amounts of reaction taken in the primary and secondary reforming steps are adjusted so that the quantity of nitrogen introduced in air in the secondary reforming step affords substantially the required molar ratio of $3H_2$ to $1N_2$ in the final ammonia synthesis gas.

The trend in recent reforming plant construction, for hydrogen or ammonia synthesis gas, has been toward operation at higher pressures. This has economic advantages, but also has the disadvantge that thick-walled tubes must be used to contain the catalyst bed. Expensive alloy steels are required, since ordinary steels have inadequate strength at the temperatures of the reforming step. Even with special steels, the tube wall temperatures must be carefully controlled during operation, for a small rise in temperature from the operating level would cause tube failure.

A disadvantage of the foregoing prior art processes is that they make less than ideal use of heat generated at high temperature levels, or which might be generated at such levels. Sensible heat introduced into the gases at high temperature during primary and secondary reforming steps is degraded to the temperature of steam. Much of the heat generated by Reaction 2 is made available at a relatively low temperature. Heat developed by the absorption of $CO_2$ by a scrubbing liquor is at too low a level to be of any use.

A disadvantage of the prior art for manufacture of hydrogen for treating off-grade petroleum fractions (such as sulfurous oils or heavy residual oils) is the fact that a sulfurous, metal-containing heavy residual oil, which is often the petroleum refiner's cheapest available fuel, is not a suitable fuel for firing reformer furnace tubes.

Summary of the invention

An object of the invention is to provide an improved process which requires less fuel for the production of hydrogen or ammonia synthesis gas than previously known processes.

An object of the present invention is to provide a process for manufacture of hydrogen in which reforming, shift, and carbon-dioxide removal are conducted in a way such that the following sources of high-temperature heat are available to drive the reforming step:

(a) Much of the sensible heat put into the gases during the reforming step itself;
(b) Much of the heat generated by Reaction 2; and
(c) Much of the heat generated by the absorption of $CO_2$ by an absorption medium.

Another object of the invention is to provide a process for manufacture of ammonia synthesis gas in which reforming, shift, and carbon-dioxide removal are conducted in a way such that substantially all of the sensible heat put into the gases during a secondary reforming step is available to drive a primary reforming step, along with heat sources (b) and (c) listed above.

Still another object of the invention is to conduct reforming in a manner such that tube walls may be relatively thin, and also such that their temperature is held at a safe level by control means which are simple and practically fool-proof.

Yet another object is to permit use of a heavy residual oil to fire the process when hydrogen is manufactured for oil-treating purposes.

A particular object of the invention is to eliminate use of a liquid absorbent for removal of $CO_2$.

A special object of the invention is to conduct reforming—secondary, if any, as well as primary—together with shift and $CO_2$ removal in a single vessel.

A further object is to reduce the CO-content of product to a level below that which can be practicably reached with use of a single stage of conventional water-gas shift.

Other objects and advantages of the invention will become apparent to those skilled in the art from the description thereof.

According to the present invention there is provided a process for producing hydrogen, or ammonia synthesis gas as hereinafter explained, by means of reacting a hydrocarbon feed stock with steam over a fixed bed or beds of reforming catalyst bounded by heat-transfer walls and of treating a hydrogen-containing effluent gases with a pulverulent solid consisting of intermingled microscopic crystallites of calcium oxide and magnesium oxide, in which the steps are conducted at a substantially elevated pressure, the solid is added at a substantially elevated temperature to the effluent gases, and the mixture of effluent gases and solid is passed in counter-current heat-transfer relationship with the fixed bed or beds.

The aforementioned pulverulent solid is advantageously derived by calcining naturally-occurring dolomite rock. This is a common rock of wide distribution. Its structure resembles that of calcite, i.e., alternating layers of carbonate ions and cations. Ideally, cation planes populated entirely by $Mg^{++}$ alternate with planes populated entirely by $Ca^{++}$. Natural dolomite seldom attains the ideal of one atom of Mg for each atom of Ca, the latter usually being present in excess.

When dolomite is calcined, intermingled crystallites of magnesium oxide and calcium oxide are formed which have no "memory" of the ordered arrangement of these elements in the dolomite structure. The crystallites are microscopic in size and are highly reactive chemically. Magnesium oxide and calcium oxide have contrasting and complementary chemical properties. The CaO crystallites are reactive toward $CO_2$ at temperatures above about 600° F.—i.e., they absorb $CO_2$ with formation of crystallites of $CaCO_3$. The MgO crystallites are not reactive toward $CO_2$, but form a rugged, porous structure which can readily be penetrated by $CO_2$; thus substantially all the CaO throughout the solid can be reacted. The CaO can be converted to $CaCO_3$, and then calcined, and the cycle repeated many times with no chemically-induced decrepitation of the solid. Calcium oxide by itself not only tends to decrepitate when it reacts with carbon dioxide, but also the reaction tends to stop at conversions of only about 20 to 30 percent of the initial oxide. The decrepitated $CaCO_3$ is so small that it passes through cyclone separators and is lost from the system, causing a very high make-up rate.

Although unreactive toward $CO_2$, the MgO crystallites in calcined dolomite have an important chemical property; they are catalytic for the water-gas shift Reaction 2 at temperatures above about 750° F. Accordingly, calcined dolomite has the power to "treat" reformed gases by the following treating reaction:

$$[CaO+MgO]+H_2O+CO=[CaCO_3+MgO]+H_2 \quad (3)$$

Here, for convenience, calcined dolomite is expressed by the symbol [CaO+MgO]; and a solid consisting of intermingled microscopic crystallites of $CaCO_3$ and MgO is expressed by the symbol [$CaCO_3$+MgO]. It will be recognized that treating Reaction 3 is the summation of water-gas shift Reaction 2 and the following reaction whereby $CO_2$ is absorbed by calcined dolomite:

$$[CaO+MgO]+CO_2=[CaCO_3+MgO] \quad (4)$$

Artificially-made dolomites are known, differing little from natural dolomites, and calcined products prepared from such materials are satisfactory. An artificial product produced by calcining the mixed coprecipitated $$CaCO_3$$

and $MgCO_3$, preferably in which Mg exceeds Ca on an atomic basis, is satisfactory. The terms [CaO+MgO] and [$CaCO_3$+MgO] are intended to include solids prepared from artificial as well as natural materials.

A simple physical mixture of macroscopic particles of CaO and MgO is not a suitable solid for conducting the present invention, since decrepitation of CaO undergoing reaction with $CO_2$ will prevent repetitive use of the solid for absorption of $CO_2$ from reformed gases, i.e., require large amounts of make-up CaO.

Spent solid from Reaction 3 may be calcined for re-use. Calcination must not be conducted at too high a temperature, lest sintering of the solid should occur, entailing loss of surface area and increase in density. The usefulness of the calcined product, both for absorbing $CO_2$ and for catalyzing shift, would be impaired. The maximum calcination temperature varies with dolomite sources. The safe calcination temperature tends to be higher for stones displaying higher ratios of Mg to Ca on an atomic basis. Stones are common which may be safely calcined at a temperature of about 1900° F. At least one stone (the Greenfield formation of Western Ohio) may be calcined at 1950° F. without loss of effectiveness, and such a stone is preferred.

Attention is directed to the fact that the present invention may not be practiced with combinations of alkaline-earth oxides other than CaO and MgO. Only MgO is sufficiently catalytic toward water-gas shift. While strontium and barium oxides absorb $CO_2$ to form carbonates, the temperatures required to decompose these carbonates are so high that MgO, if it were present, would sinter and lose its catalytic powers.

According to the present invention, by conducting treating Reaction 3 at an elevated pressure and in the temperature range from about 1200° F. to about 1700° F., this exothermic Reaction 3 is made to supply a major part of the endothermic heat required by Reaction 1, while at the same time Reaction 3 accomplishes a major part of both water-gas shift and $CO_2$ removal. Reforming tubes are preferably placed in a vertical position, and the steam-hydrocarbon mixture is caused to flow downward in the tubes. Gases emerging from the bottom of the tubes are mixed with hot [CaO+MgO], and the mixture of gases and solid is passed upward around the tubes in counter-current heat-transfer relationship with the tubes.

When hydrogen is produced without use of a secondary reforming step, the counter-current heat-transfer is advantageously arranged to cool the mixture of gases and solid to a temperature appreciably lower than the temperature at which gases leave the reforming tubes.

When ammonia synthesis gas is desired, a secondary reforming step is interposed between the primary reforming tubes and the point at which gases are mixed with hot [CaO+MgO]. In this way, sensible heat put into the gases during secondary reforming is made available to drive the primary reforming step.

The mixture of gases and solid emerging from the aforementioned heat-transfer may advantageously be cooled to afford a final treatment by Reaction 3 at a temperature just above the temperature at which $Ca(OH)_2$ would form at the partial pressure of steam in the gases. By conducting the final treatment at a temperature as low as possible, thermodynamic equilibria for Reactions 3 and 4 favor the least possible content of CO and $CO_2$ in product gases. The content of CO₂ in the gases is governed by the equilibrium decomposition pressure of CaCO₃, which declines with temperature. The content of CO is governed by equilibrium for Reaction 3, which tends toward the right at lower temperature. However, Ca(OH)₂ must not be allowed to form in any substantial amount, for in such case, decrepitation of the solid would occur.

After the final treatment, product gases are separated from solid, and the solid [CaCO₃+MgO] is heated in a calcination step to expel CO₂ and regenerate [CaO+MgO] for re-use in the process.

If the hydrogen product is to be used for treating sulfurous oils, the presence of a minor quantity of H₂S in the hydrogen product is not a disadvantage. In this case, the solid may contain microscopic crystallites of CaS intermingled with the crystallites of CaO and MgO. Accordingly, the calcination step may be fired with a cheap heavy residual oil containing sulfur and metals. The concentration level of metals deposited on the solid may be controlled by a suitable program of solid discards and make-up. Sulfur is absorbed by the solid to form CaS if the calcination step is conducted to furnish a lean fuel gas, rather than a flue gas, by supplying an insufficient quantity of air for complete combustion of fuel supplied to the step. The fuel gas should contain sufficient amounts of H₂ and CO to preserve CaS from oxidation in the calcination step. Elemental sulfur may be recovered from the solid by the method disclosed in my copending application Ser. No. 337,900, filed Jan. 15, 1964, now U.S. Patent 3,276,203, which issued Oct. 4, 1966.

The process of the invention is conducted between about 50 and about 600 pounds per square inch absolute (p.s.i.a.), and preferably between about 150 and about 450 p.s.i.a. The initial steam-to-carbon ratio is desirably higher than about 1.8, and is preferably between 1.8 and about 4.

The primary reforming step is advantageously carried to between about 1400° F. and 1650° F., and preferably between about 1450° F. and 1600° F. The secondary reforming step is advantageously carried to between about 1650° F. and 2000° F.

The partial pressure of steam in effluent gases at the point where gases are mixed with hot [CaO+MgO] should not exceed about 190 p.s.i.a., to avoid agglomeration of the solid.

The temperature of the final treatment with

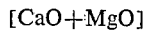
[CaO+MgO]

will in general fall between about 1050° F. and 1250° F.; but this temperature should be checked, along with the partial pressure of steam, against the equilibrium decomposition pressure of Ca(OH)₂, whose formation should be avoided.

Calcination is conducted at a temperature sufficient to decompose CaCO₃ at the operating pressure level. With many naturally-occurring dolomites, the temperature of the calcination step may be adjusted to afford a CO₂ partial pressure of about 6 atmospheres in the effluent. Some dolomites permit operation to afford a partial pressure as high as 8 atmospheres. The temperature of the calcination step will in general fall between about 1800° F. and 1950° F.

Calcination may be conducted at a lower temperature or a higher total pressure than would otherwise be possible if effluent from the calcination is a lean fuel gas—i.e., if air is supplied in an amount insufficient for complete combustion of fuel committed to the step. Presence of H₂ in effluent from calcination has a greater effect in reducing CO₂ partial pressure than presence of inert gas, because H₂ reduces CO₂ by the reverse of Reaction 2.

Purge gases from an ammonia synthesis train are an advantageous fuel for calcination, since the gases contain relatively little carbon.

Both Reaction 3 and calcination are advantageously conducted in beds of solid maintained in the so-called dense-phase fluidized state.

Brief description of the drawings

FIGURE I shows an embodiment of the invention suitable for production of hydrogen of a purity of around 90 volume percent.

FIGURE II shows an embodiment of the invention suitable for production of ammonia synthesis gas or high-purity hydrogen.

Description of preferred embodiments

Figure 2:
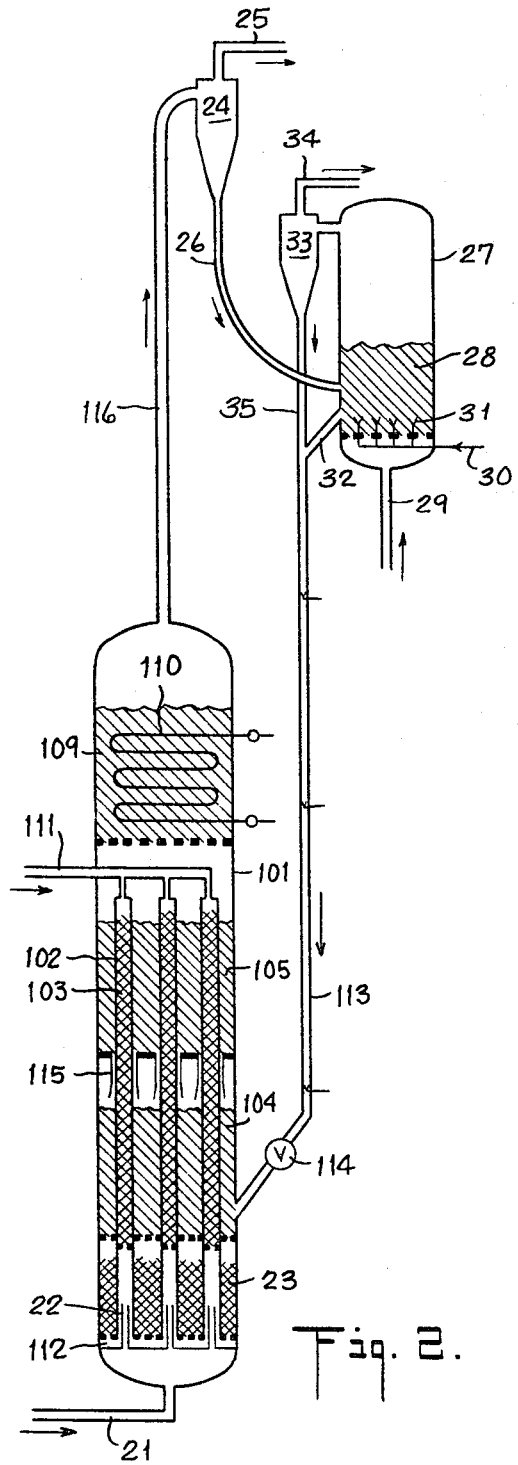
Figure 1:
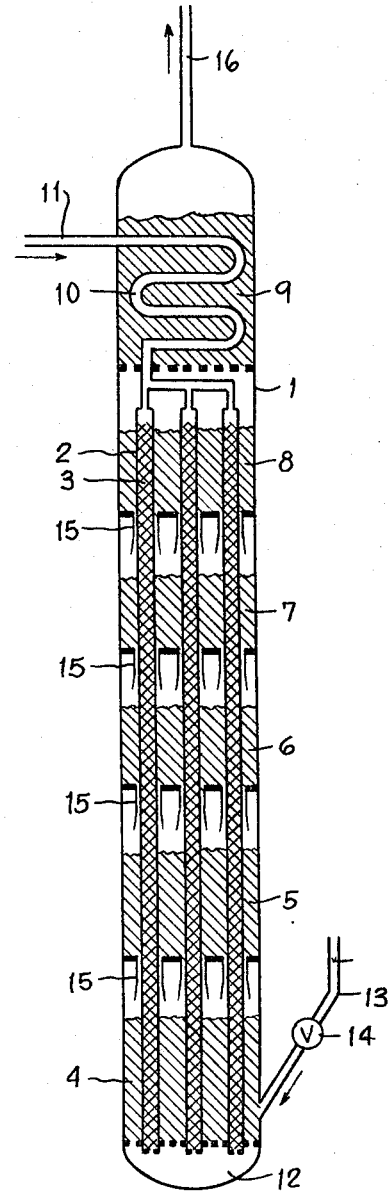

Reference may now be had to FIG. I, which shows an embodiment of the invention suitable for production of hydrogen of a purity of around 90 percent and provides both an understanding of the working of the apparatus shown therein and also a numerical example.

Vessel 1 houses a plurality of vertical tubes 2, which are packed with a suitable nickel-base reforming catalyst 3, which is readily available. Vessel 1 also contains treating-beds 4, 5, 6, 7, 8, and 9. Solid in the treating-beds consists of [CaO+MgO] partially converted to

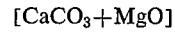
[CaCO₃+MgO]

and is maintained by the upward passage of gas in the so-called dense-phase fluidized state. Solid in treating-beds 4, 5, 6, 7, and 8 surround and is in contact with tubes 2, so that heat flows from these beds across the walls of tubes 2 into catalyst 3. Treating-bed 9 contains heat-transfer coil 10, which removes heat from bed 9.

A stream comprising 1000 moles of CH₄ and 2270 moles of H₂O is introduced at about 658° F. and 400 p.s.i.a. via pipe 11 into heat-transfer coil 10, where the stream is heated to about 1052° F. From coil 10, the stream passes into the plurality of tubes 2, where the gas mixture is heated to about 1600° F. with conversion of 71.5 percent of CH₄ according to Reaction 1. Gases emerge from tubes 2 at 355 p.s.i.a. into plenum space 12, from which the gases flow into treating-bed 4.

Aerated standpipe 13, via solid-flow-regulating valve 14, delivers 1166.67 moles of [CaO+MgO] at about 1900° F. to bed 4. Gases maintain the solid in bed 4 in the dense-phase fluidized state. The temperature of bed 4 is controlled (in a manner to be discussed hereinafter) at about 1650° F. A portion of CO₂ in the gases is absorbed by [CaO+MgO] in bed 4 to form

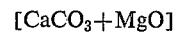
[CaCO₃+MgO]

the extent of absorption of CO₂ is limited by equilibrium for Reaction 4 at the temperature of bed 4. A portion of CO in the gases is converted to H₂ by Reaction 3; the extent of conversion of CO is limited by equilibrium for Reaction 3 at the temperature of bed 4. Bed 4 should be sufficiently deep both to afford adequate tube-surface for heat transfer and also to permit a reasonably close approach to the foregoing equilibria. An approach of about 85 to 90 percent of equilibrium is adequate.

Gases together with solid partially converted to

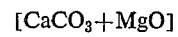
[CaCO₃+MgO]

pass upward from bed 4 through narrow annular spaces formed between tubes 2 and shrouds 15 into treating-bed 5. Solid is conveyed upward through these annular spaces in the so-called dilute-phase transport condition. Bed 5 operates at about 1600° F. In bed 5, an additional portion of CO₂ is absorbed, and an additional portion of CO is converted to H₂, in accordance with the equilibria at the temperature of bed 5. In similar manner, gases and solid flow successively from bed 5 to bed 6, from bed 6 to bed 7, and from bed 7 to bed 8. Beds, 6, 7, and 8 operate at about 1500° F., 1400° F., and 1300° F., respectively.

Attention is directed to the fact that, although the temperature of bed 8 is 300° F. lower than the temperature of gases leaving reforming tubes 2, nevertheless, heat generated in bed 8 still serves to support reforming Reaction 1 in the early stages of this reaction. Accordingly, much of the sensible heat put into the gases during reforming is returned to the reforming step.

Gases together with solid conveyed upward in dilute-phase transport pass from bed 8 into final treating-bed 9, which operates at about 1130° F. Gaseous effluent from bed 9 comprises 285 moles of $CH_4$; 2858 moles of $H_2$; 2 moles of CO; 1 mole of $CO_2$; and 842 moles of $H_2O$. Solid effluent from bed 9 comprises 712 moles of $$[CaCO_3 + MgO]$$

and 454.67 moles of $[CaO + MgO]$. Gases together with solid conveyed in dilute-phase transport pass upward through pipe 16 from vessel 1.

Subsequent treatment of the product gases and calcination of the solid for return via standpipe 13 to bed 4 will be discussed in connection with FIG. II.

The rate of flow of solid from standpipe 13 into bed 4 is the primary operating control on the temperature of bed 4. This control is relatively unresponsive toward an attempt to raise the temperature of bed 4. That is to say, even a relatively large increase in solid flow rate would cause only a relatively small rise in bed 4 temperature. Moreover, there is no danger of a "runaway" in the temperature of bed 4; a rise in temperature limits the extent of both Reactions 3 and 4, because equilibria for these reactions are less favorable at higher temperature. Accordingly, control of the tube-wall temperatures of tubes 2 within bed 4 is simple and relatively fool-proof. Moreover, because of the nature of the fluidized-solid state, temperatures within bed 4 are highly uniform, and risk of overheating in a portion of the bed is negligible. Since pressure differentials across the walls of tubes 2 are inherently small within bed 4, relatively thin-walled tubes may be used, with worthwhile saving in cost.

Although pressure differentials across walls of tubes 2 are progressively greater in treating-beds 5, 6, 7, and 8, nevertheless, relatively thin-walled tubes may be used throughout, since steel strength is higher at lower temperature.

Reference may now be had to FIG. II, which shows an embodiment of the invention suitable for production of ammonia, synthesis gas or high-purity hydrogen and provides both an understanding of the working of the apparatus shown therein and also a numerical example.

A stream comprising 1000 moles of $CH_4$ and 2850 moles of $H_2O$ is introduced at about 658° F. and 400 p.s.i.a. via pipe 111 into a plurality of vertical tubes 102, which are packed throughout the upper part of their length with a suitable nickel-base reforming catalyst 103. The tubes are housed in vessel 101, which also contains treating-beds 104, 105, and 109, as well as fixed bed 23 of a nickel-base catalyst suitable for secondary reforming, which is readily available. Heat is supplied to the $CH_4/H_2O$ mixture by heat-transfer from treating beds 104 and 105 across the walls of tubes 102, and the mixture is heated to about 1512° F. with conversion of 64.7 percent of $CH_4$ according to Reaction 1.

The catalyst-packed part of tubes 102 terminates at approximately the bottom elevation of treating-bed 104. The lower part of the tubes, passing through fixed bed 23 into plenum space 112, is empty. Gases emerge from the catalyst-packed part of tubes 102 at 355 p.s.i.a. and are intimately mixed with 1423,63 moles of air at 900° F. and 355 p.s.i.a., introduced via pipe 21 and small tubes 22 which penetrate the empty part of tubes 102. The gas-air mixture flows via plenum space 112 into bed 23, where secondary reforming occurs: Combination raises the temperature of the gases to about 1900° F.; and methane conversion, by means of combustion and Reaction 1, is carried to 99 percent.

Gases pass directly from bed 23 into treating-bed 104, where they maintain a solid consisting of $[CaO + MgO]$ partially converted to $[CaCO_3 + MgO]$ in the dense-phase fluidized state. Reactions in bed 104 are those already described in connection with bed 4 of FIG. I. Bed 104 operates at about 1625° F., and supplies heat to the primary reforming step occurring in the catalyst-packed part of tubes 102. Aerated standpipe 113, via solid-flow-regulating valve 114, delivers 1166.67 moles of $$[CaO + MgO]$$

at about 1900° F. to bed 104.

Gases together with solid conveyed in dilute-phase transport pass upward from bed 104 through narrow annular spaces formed between tubes 102 and shrouds 115 into treating-bed 105, where solid is maintained in the dense-phase fluidized state. Bed 105 operates at about 1500° F. Since bed 105 operates 12° F. below the temperature of gases emerging from primary reforming catalyst 103, all of the sensible heat put into the gases during secondary reforming is made available to drive the primary reforming reaction. In addition, a small part of the sensible heat put into the gases during the primary reforming step is returned to this step.

Gases together with solid conveyed in dilute-phase transport pass upward from bed 105 into final treating-bed 109, where solid is maintained in the dense-phase fluidized state. Bed 109 operates at about 1200° F. Bed 109 contains heat-transfer surface 110, which may advantageously be used to raise or superheat high-pressure steam.

Gaseous effluent from bed 109 comprises 10.00 moles of $CH_4$; 3358.36 moles of $H_2$; 4.00 moles of CO; 3.00 moles of $CO_2$; 1471.64 moles of $H_2O$; 1110.86 moles of $N_2$; and 13.95 moles of A. Solid effluent from bed 109 comprises 983.00 moles of $[CaCO_3 + MgO]$ and 183.67 moles of $[CaO + MgO]$. Gases together with solid conveyed in dilute-phase transport pass upward from bed 109 through pipe 116 into solid-gas-separating cyclone 24, from which gases emerge via pipe 25, while solid moves downward via pipe 26.

Gases in pipe 25 are at about 1200° F. and about 330 p.s.i.a., and may be further treated (by equipment not shown) for final preparation for ammonia synthesis. The gases are cooled with recovery of heat and condensation of water. Water is separated from the gases and either discarded or re-used as boiler-feed-water to prepare steam for the process. The gases are then reheated and committed to a catalytic methanation step, to convert CO and $CO_2$ substantially quantitatively to $CH_4$. The gases are again cooled, and are compressed to the pressure of ammonia synthesis.

Solid passes from pipe 26 into vessel 27, which houses fluidized bed 28, operating at about 1900° F. Bed 28 is fluidized with air introduced via pipe 29 and fuel introduced via line 30 and nozzles 31. The fuel advantageously includes purge gas from the ammonia synthesis step. Combustion in bed 28 supplies heat to decompose $[CaCO_3 + MgO]$. Calcined solid $[CaO + MgO]$ is withdrawn from bed 28 via line 32 into standpipe 113. Flue gas effluent from bed 28 is separated in cyclone 33 from any solid carried by the gas. Gases leave via pipe 34 at about 1900° F. and about 330 p.s.i.a., and may be sent to heat-recovery heat exchangers and a power-recovery expansion turbine (not shown). Solid from cyclone 33 moves downward via pipe 35 into standpipe 113.

The aforementioned recoveries of heat from gases in pipes 25 and 34 may advantageously be put to process use. Some of the heat may be used to preheat reactants (hydrocarbon/steam to pipe 111 and air to pipe 21). The remainder, along with heat released in bed 109 to heat-transfer surface 110, may be used to raise high-pressure, superheated steam. Power may be generated by expansion of the steam in a turbine, from which steam may be bled for use in the reforming step at an intermediate stage in the expansion process. Typically, power generated by such a steam-expansion turbine, together with power from the aforementioned expansion turbine acting on gases from pipe 34, can supply all power needed both for the production of ammonia synthesis gas and for the ammonia synthesis step as well. Accordingly, no fuel is required to sustain overall ammonia synthesis other than fuel committed to the calciner in line 30. This fuel is appreciably less than the fuel needed to fire the reformer and to raise steam for an ammonia synthesis plant employing the prior art method of producing synthesis gas. In one example, the saving in fuel amounted to about 50%. The saving in fuel is a consequence of the more efficient use of high-temperature heat by the present invention.

The equipment of FIG. II may be operated to produce high-purity hydrogen if a mixture of steam and oxygen is substituted for air introduced via pipe 21.

Equipment similar to items 24 throught 35 of FIG. II may advantageously work in cooperation with the apparatus of FIG. I to separate solid in line 16 from hydrogen product gas and to calcine the solid so that it may be returned for re-use in treating-bed 4 via standpipe 13. Heat may be recovered by cooling hydrogen product from line 25 (with condensation of water, which is separated from hydrogen product) and by cooling calciner effluent from line 34. Power may be recovered from calciner effluent by a power-recovery expansion turbine. Typically, the aforementioned recoveries of heat are sufficient both to raise steam for the process and to preheat reactants to reforming, and so no other fuel is required save fuel in line 30 to calciner 27. In an example producing hydrogen of about 90% purity, this fuel was about 30% less than fuel needed to fire a reformer according to the prior art. In addition to the saving in fuel, the example had the advantage of producing byproduct power, since power recovered from the aforementioned expansion turbine exceeded the requirements of the process.

If hydrogen is produced according to FIG. I for hydrogenation of a sulfurous petroleum oil, the sulfurous residue of the hydrogenation operation (or another sulfurous fuel) is advantageously used as fuel to calciner 27. It is advantageous to supply air to the calciner in an amount insufficient for complete combustion of the fuel, so that effluent is a lean fuel gas rather than a flue gas. Elemental sulfur may be recovered from CaS by the method of my copending application Ser. No. 337,900, filed Jan. 15, 1964, now U.S. Patent 3,276,203, which issued Oct. 4, 1966. A small quantity of $H_2S$ will appear in hydrogen product in line 16, but this is not a disadvantage for the oil-hydrogenation process.

If recovery of elemental sulfur is not desired, the fixation of sulfur either as $CaSO_4$ or CaS may be avoided by conducting the calcination with a *slight* deficiency of air, that the molar ratio $H_2O/H_2$ in effluent is less than a critical value of the order of 100. The result is that $SO_2$ appears in calciner gaseous effluent.

My invention is not limited to the particular embodiments of FIGS. I and II. Those skilled in fluidized-solids art will readily recognize that different vessel-configurations and solid-flow-paths may be used without departing from the spirit of the invention. For example, in an embodiment having the same purpose as FIG. II a vessel similar to vessel 101 could be placed at a high elevation while a vessel similar to vessel 27 is placed near grade. This arrangement would facilitate withdrawal of a portion of the solid from bed 105 via a standpipe discharging into bed 28, thereby limiting the quantity of solid entering bed 109 to an amount needful for the relatively small extent of Reactions 3 and 4 which occur therein. This arrangement would have the advantage of reducing the requirement of fuel to bed 28; but it complicates the transfer of hot [CaO+MgO] from bed 28 to bed 104, and the arrangement shown in FIG. II is preferred. Other layouts are possible, including arrangement for individual feeding of solid to each treating-bed and individual withdrawal of solid therefrom. Feeding fresh, unconverted [CaA+MgO] to the final treating-bed (e.g., bed 109) would have the advantage of raising the activity of solid in this final stage of reduction in CO and $CO_2$ content. There may sometimes be advantage in using a greater or lesser number of treating-beds in heat-transfer relationship with primary reforming tubes than the five and two beds shown respectively in the figures. In general, the greater the number of beds, the larger is the mean temperature difference driving heat into the tubes.

Thus having described the invention, what is claimed is:

1. A process useful in the production of hydrogen comprising:
   (a) supplying a mixture of a hydrocarbon feed stock and steam at a pressure greater than about 50 p.s.i.a. and having a steam-to-carbon ratio greater than about 1.8 to a fixed bed of a reforming catalyst situated within a first space separated from a second space by interposed substantially vertical heat-transfer walls;
   (b) causing said mixture of hydrocarbon feed stock and steam to flow downwardly through said fixed bed and causing the mixture to react to produce a reformed gas comprising hydrogen, carbon monoxide, carbon dioxide, steam, and methane by supplying heat to said fixed bed across said walls, thereby satisfying the endothermicity of the reforming reaction and raising said reformed gas to an exit temperature not below about 1400° F.;
   (c) withdrawing said reformed gas at said exit temperature from said fixed bed;
   (d) supplying a pulverulent solid containing intermingled microscopic crystallites of calcium oxide and magnesium oxide to each of several vertically-disposed portions of said second space, said solid being capable of exothermically converting carbon monoxide and steam to hydrogen and carbon dioxide through the catalytic action of magnesium oxide and also capable of exothermically absorbing carbon dioxide with the formation of calcium carbonate;
   (e) causing said reformed gas without a substantial loss of pressure to flow upwardly into and through the lowermost of said portions of said second space and in contact with said pulverulent solid therein, thereby causing the exothermic conversion of a portion of the carbon monoxide and steam in said reformed gas to hydrogen and carbon dioxide and the exothermic absorption of a portion of the carbon dioxide, said pulverulent solid in said lowermost portion of said second space being maintained in a dense-phase fluidized bed through the action of the gases which result from said conversion and said absorption, the temperature of said fluidized bed being higher than said exit temperature from said fixed bed, so that heat passes from said fluidized bed to said fixed bed, said heat arising at least in part from said conversion and said absorption and constituting a portion of said heat supplied to said fixed bed across said walls; and
   (f) causing said resulting gases to flow upwardly through the remaining portions of said second space and in contact with said pulverulent solid therein, thereby causing additional conversion of carbon monoxide and additional absorption of carbon dioxide and supplying additional heat to said fixed bed from said additional exothermic conversion and absorption and from the cooling of the gases which result therefrom, said pulverulent solid in each portion of said second space being maintained in a dense-phase fluidized bed through the action of said resulting gases.

2. A process useful in the production of ammonia synthesis gas comprising:
   (a) supplying a mixture of a hydrocarbon feed stock and steam at a pressure greater than about 50 p.s.i.a. and having a steam-to-carbon ratio greater than about 1.8 to a fixed bed of a primary reforming catalyst situated within a first space separated from a second space by interposed substantially vertical heat-transfer walls;

(b) causing said mixture of hydrocarbon feed stock and steam to flow downwardly through said fixed bed and causing the mixture to react to produce a first reformed gas comprising hydrogen, carbon monoxide, carbon dioxide, and methane by supplying heat to said fixed bed across said walls, thereby satisfying the endothermicity of the reforming reaction and raising said first reformed gas to an exit temperature not below about 1400° F.;

(c) withdrawing said first reformed gas at said exit temperature from said fixed bed;

(d) effecting a mixture of air with said first reformed gas, reacting said mixture over a bed of a secondary reforming catalyst to produce a second reformed gas comprising primarily nitrogen, hydrogen, carbon monoxide, carbon dioxide, and steam, and withdrawing said second reformed gas from said bed of secondary reforming catalyst;

(e) supplying a pulverulent solid containing intermingled microscopic crystallites of calcium oxide and magnesium oxide to each of several vertically-disposed portions of said second space, said solid being capable of exothermically converting carbon monoxide and steam to hydrogen and carbon dioxide through the catalytic action of magnesium oxide and also capable of exothermically absorbing carbon dioxide with the formation of calcium carbonate;

(f) causing said second reformed gas without a substantial loss of pressure to flow upwardly into and through the lowermost of said portions of said second space and in contact with said pulverulent solid therein, thereby causing the exothermic conversion of a portion of the carbon monoxide and steam in said second reformed gas to hydrogen and carbon dioxide and the exothermic absorption of a portion of the carbon dioxide, said pulverulent solid in said lowermost portion of said second space being maintained in a dense-phase fluidized bed through the action of the gases which result from said conversion and said absorption, said fluidized bed being at a temperature above said exit temperature from said fixed bed, so that heat passes from said fluidized bed to said fixed bed, said heat arising at least in part from said conversion and said absorption and constituting a portion of said heat supplied to said fixed bed across said walls; and (g) causing said resulting gases to flow upwardly through the remaining portions of said second space and in contact with said pulverulent solid therein, thereby causing additional conversion of carbon monoxide and additional absorption of carbon dioxide and supplying additional heat to said fixed bed from said additional exothermic conversion and absorption and from the cooling of the gases which result therefrom, said pulverulent solid in each said portion of said second space being maintained in a dense-phase fluidized bed through the action of said resulting gases.

3. The process of claim 2, including the additional steps:

withdrawing solid from each of said portions of said second space;

calcining the solid withdrawn from at least one of said portions to expel carbon dioxide, said calcining being accomplished by burning a fuel with air in contact with said solid, said air being supplied in an amount insufficient for complete combustion of said fuel, so that effluent gas from said calcining is lean fuel gas; and supplying the resulting calcined solid to at least one of said portions of said second space.

4. The process of claim 2, including the additional step:

cooling the gases resulting from step (g) and contacting said gases with a pulverulent solid containing intermingled microscopic crystallites of calcium oxide and magnesium oxide at a temperature just above the temperature at which $Ca(OH)_2$ would form at the partial pressure of steam in said gases, thereby causing additional conversion of carbon monoxide and absorption of carbon dioxide.

5. A process useful in the production of high-purity hydrogen comprising:

(a) supplying a mixture of a hydrocarbon feed stock and steam at a pressure greater than about 50 p.s.i.a. and having a steam-to-carbon ratio greater than about 1.8 to a fixed bed of a primary reforming catalyst situated within a first space separated from a second space by interposed substantially vertical heat-transfer walls;

(b) causing said mixture of hydrocarbon feed stock and steam to flow downwardly through said fixed bed and causing the mixture to react to produce a first reformed gas comprising hydrogen, carbon monoxide, carbon dioxide, steam, and methane by supplying heat to said fixed bed across said walls, thereby satisfying the endothermicity of the reforming reaction and raising said first reformed gas to an exit temperature not less than about 1400° F;

(c) withdrawing said first reformed gas at said exit temperature from said fixed bed;

(d) effecting a mixture of oxygen with said first reformed gas, reacting said mixture over a bed of a secondary reforming catalyst to produce a second reformed gas comprising primarily hydrogen, carbon monoxide, carbon dioxide, and steam, and withdrawing said second reformed gas from said bed of secondary reforming catalyst;

(e) supplying a pulverulent solid containing intermingled microscopic crystallites of calcium oxide and magnesium oxide to each of several vertically-disposed portions of said second space, said solid being capable of exothermically converting carbon monoxide and steam to hydrogen and carbon dioxide through the catalytic action of magnesium oxide and also capable of exothermically absorbing carbon dioxide with the formation of calcium carbonate;

(f) causing said second reformed gas without a substantial loss of pressure to flow upwardly into and through the lowermost of said portions of said second space and in contact with said pulverulent solid therein, thereby causing the exothermic conversion of a portion of the carbon monoxide and steam in said second reformed gas to hydrogen and carbon dioxide and the exothermic absorption of a portion of the carbon dioxide, said pulverulent solid in said lowermost portion of said second space maintained in a dense-phase fluidized bed through the action of the gases which result from said conversion and said absorption, said fluidized bed being at a temperature above said exit temperature from said fixed bed, so that heat passes from said fluidized bed to said fixed bed, said heat arising at least in part from said conversion and said absorption and constituting a portion of said heat supplied to said fixed bed across said walls; and (g) causing said resulting gases to flow upwardly through the remaining portions of said second space and in contact with said pulverulent solid therein, thereby causing additional conversion of carbon monoxide and additional absorption of carbon dioxide and supplying additional heat to said fixed bed from said additional exothermic conversion and absorption and from the cooling of the gases which result therefrom, said pulverulent solid in each said portion of said second space being maintained in a dense-phase fluidized bed through the action of said resulting gases.

6. A process useful in the production of hydrogen comprising:
(a) supplying a mixture of hydrocarbon and steam having a steam-to-carbon ratio between about 1.8 and 4 and a pressure between about 50 and 600 p.s.i.a. to the top of a fixed bed of a nickel-based reforming catalyst bounded by heat-transfer walls;
(b) causing said mixture to flow downwardly through said fixed bed while supplying heat across said walls to cause the mixture to react to produce a reformed gas comprising hydrogen, carbon monoxide, carbon dioxide, steam, and methane and to raise the reformed gas to an exit temperature between about 1400° F. and 1650° F;
(c) withdrawing said reformed gas at said exit temperature from said fixed bed and causing the gas without a substantial loss of pressure to flow upwardly into and through a space bounded by said walls and an outer enclosure;
(d) supplying a pulverulent solid containing intermingled microscopic crystallites of calcium oxide and magnesium oxide to each of several vertically-disposed treating stages within said space, said solid being capable of treating said reformed gas to convert carbon monoxide and steam exothermically to hydrogen and carbon dioxide through the catalytic action of magnesium oxide and also to absorb carbon dioxide exothermically with the formation of calcium carbonate; and
(e) treating said upwardly flowing gas in each of said treating stages in turn, each successive treatment being at a lower temperature than the previous one, said solid being maintained within each said treating stage in the dense-phase fluidized state by the upwardly flowing gas and coming into intimate contact therewith, the physically lowermost treating stage having a temperature below about 1700° F., the physically highermost stage having a temperature above about 1200° F., the said exit temperature from said fixed bed being intermediate between said temperatures of said physically lowermost and highermost stages, and heat passing across said walls from each of said treating stages to said fixed bed.

7. The process of claim 6 including the additional steps: withdrawing solid from each of said treating stages; calcining the solid withdrawn from at least one of said treating stages to expel carbon dioxide, said calcining being accomplished by burning a fuel with air in contact with said solid, said air being supplied in an amount insufficient for complete combustion of said fuel, so that effluent gas from said calcining is a lean fuel gas; and supplying the resulting calcined solid to at least one of said treating stages.

8. A process useful in the production of ammonia synthesis gas comprising:
(a) supplying a mixture of hydrocarbon and steam having a steam-to-carbon ratio between about 1.8 and 4 and a pressure between about 50 and 600 p.s.i.a. to the top of a fixed bed of a nickel-based reforming catalyst bounded by heat-transfer walls;
(b) causing said mixture to flow downwardly through said fixed bed while supplying heat across said walls to cause the mixture to react to produce a first reformed gas containing hydrogen, carbon monoxide, carbon dioxide, steam, and methane and to raise said first reformed gas to an exit temperature between about 1400° F. and 1650° F.;
(c) withdrawing said first reformed gas at said exit temperature from said fixed bed, effecting a mixture of said first reformed gas with air, and reacting said mixture over a nickel-based reforming catalyst to a temperature between about 1650° F. and 2000° F., thereby producing a second reformed gas comprising primarily nitrogen, hydrogen, carbon monoxide, carbon dioxide, and steam;
(d) causing said second reformed gas without a substantial loss of pressure to flow upwardly into and through a space bounded by said walls and an outer enclosure;
(e) supplying a pulverulent solid containing intermingled microscopic crystallites of calcium oxide and magnesium oxide to each of several vertically-disposed treating stages within said space, said solid being capable of treating said second reformed gas to convert carbon monoxide and steam exothermically to hydrogen and carbon dioxide through the catalytic action of magnesium oxide and also to absorb carbon dioxide exothermically with the formation of calcium carbonate; and
(f) treating said upwardly flowing gas in each of said treating stages in turn, each successive treatment being at a lower temperature than the previous one, said solid being maintained within each said treating stage in the dense-phase fluidized state by the upwardly flowing gas and coming into intimate contact therewith, the physically lowermost treating stage having a temperature below about 1700° F., the said exit temperature from said fixed bed being below said temperature of said physically lowermost treating stage, and heat passing across said walls from each of said treating stages to said fixed bed.

References Cited

UNITED STATES PATENTS

| | | | |
|---|---|---|---|
| 989,955 | 4/1911 | Ellenberger | 23—213 |
| Re. 19,733 | 10/1935 | Hansgirg | 23—213 |
| 2,625,470 | 1/1953 | Roberts. | |
| 2,682,455 | 6/1954 | Gorin | 23—212 X |
| 3,094,391 | 6/1963 | Mader | 23—212 |
| 3,115,394 | 12/1963 | Gorin et al. | 23—212 |

OSCAR R. VERTIZ, *Primary Examiner.*

E. STERN, *Assistant Examiner.*

UNITED STATES PATENT OFFICE
CERTIFICATE OF CORRECTION

Patent No. 3,397,962                            August 20, 1968

Arthur M. Squires

It is certified that error appears in the above identified patent and that said Letters Patent are hereby corrected as shown below:

Column 6, line 46, after "[$CaCO_3$+MgO]" insert a semicolon. Column 7, line 43, "ammonia," should read -- ammonia --; line 64, "1423,63" should read -- 1423.63 --; line 68, "Combination" should read -- combustion --. Column 9, line 75, "[CaA+MgO]" should read -- [CaO+MgO] --. Column 12, line 56, after "space" insert -- being --.

Signed and sealed this 3rd day of February 1970.

(SEAL)
Attest:

Edward M. Fletcher, Jr.                      WILLIAM E. SCHUYLER, JR.
Attesting Officer                                   Commissioner of Patents